United States Patent [19]
Winfield

[11] 3,816,234
[45] June 11, 1974

[54] IMPACT ABSORBING LAMINATE AND ARTICLES FABRICATED THEREFROM

[75] Inventor: Armand Gordon Winfield, Copiague, N.Y.

[73] Assignee: William A. M. Burden, New York, N.Y.

[22] Filed: Mar. 22, 1971

[21] Appl. No.: 126,421

[52] U.S. Cl. .................... 161/160, 52/309, 161/161, 161/247
[51] Int. Cl. ............................ B32b 3/26, B32b 5/18
[58] Field of Search ....... 260/2.5 HA; 161/160, 161, 161/93, 190, 247; 52/309; 117/72, 138.8 D, 138.8 E, 138.8 F

[56] References Cited
UNITED STATES PATENTS

| | | | |
|---|---|---|---|
| 3,256,133 | 4/1966 | Wright et al. | 117/72 X |
| 3,338,739 | 8/1967 | Rees | 260/2.5 HA |
| 3,391,823 | 7/1968 | Tijms | 161/161 |
| 3,419,455 | 12/1968 | Roberts | 161/161 |
| 3,429,085 | 2/1969 | Stillman | 161/190 |
| 3,437,197 | 4/1969 | Wirfel | 161/160 |
| 3,535,198 | 10/1970 | Bloom | 161/190 X |
| 3,567,536 | 3/1971 | Wickersham | 161/160 |
| 3,586,649 | 6/1971 | Cobbledick | 117/138.8 D |
| 3,607,601 | 9/1971 | Milam et al. | 161/160 |
| 3,619,344 | 11/1971 | Wolinski et al. | 161/161 |
| 3,627,622 | 12/1971 | Vega | 161/161 X |

Primary Examiner—William J. Van Balen
Attorney, Agent, or Firm—Lawrence W. Flynn

[57] ABSTRACT

The laminate comprises (i) a layer of impact absorbing foam, (ii) a flexible, resinous finishing layer affixed to the foam layer, and (iii) a continuous, flexible thin layer of a substantially water impermeable resin affixed to the finishing layer. In one embodiment, impact absorbing polypropylene or polyethylene foam is provided with a finishing layer of either a cross-linked polyethylene ionomeric foam or a mixture of a ground impact absorbing foam dispersed throughout an acrylic resin binder. A thin vinyl or acrylic resinous layer is affixed to the finishing layer to complete the laminate. The laminate is rigidified by affixing a stiff, self-supporting backing layer, such as a reinforced polyester or epoxy resin, to the impact absorbing foam to sandwich the foam between the backing and finishing layer.

Numerous impact absorbing articles such as walls, floors, ceilings, bathtubs, swimming pools, sinks, shower stalls, can be fabricated from the laminate. Pre-existing surfaces are rendered impact absorbing by covering such surfaces with the laminate. In addition to the safety feature arising from its impact absorbing properties, the laminate is water resistant, easy to clean and maintain, substantially dent resistant, of light weight, and attractive to the eye.

8 Claims, 17 Drawing Figures

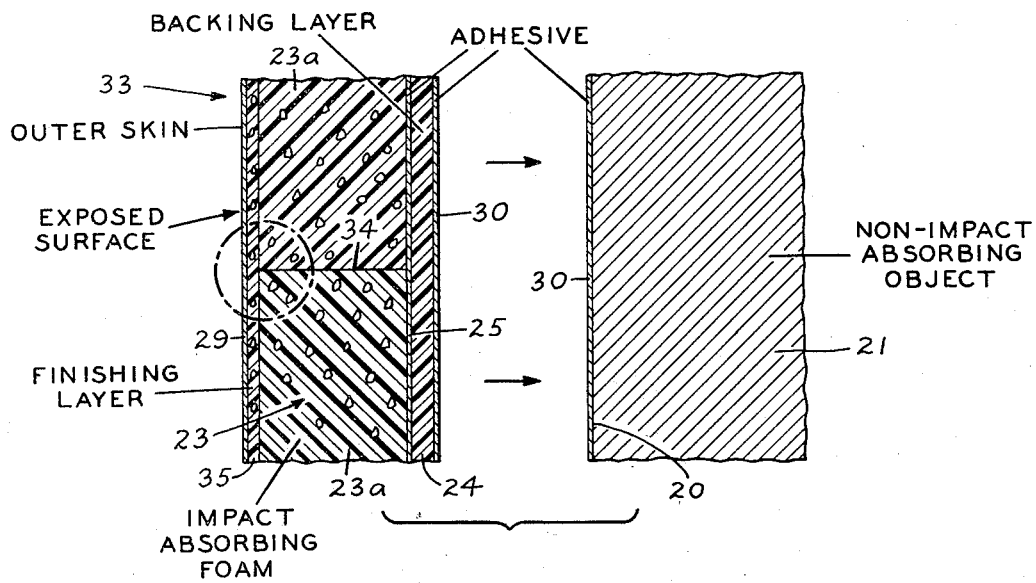
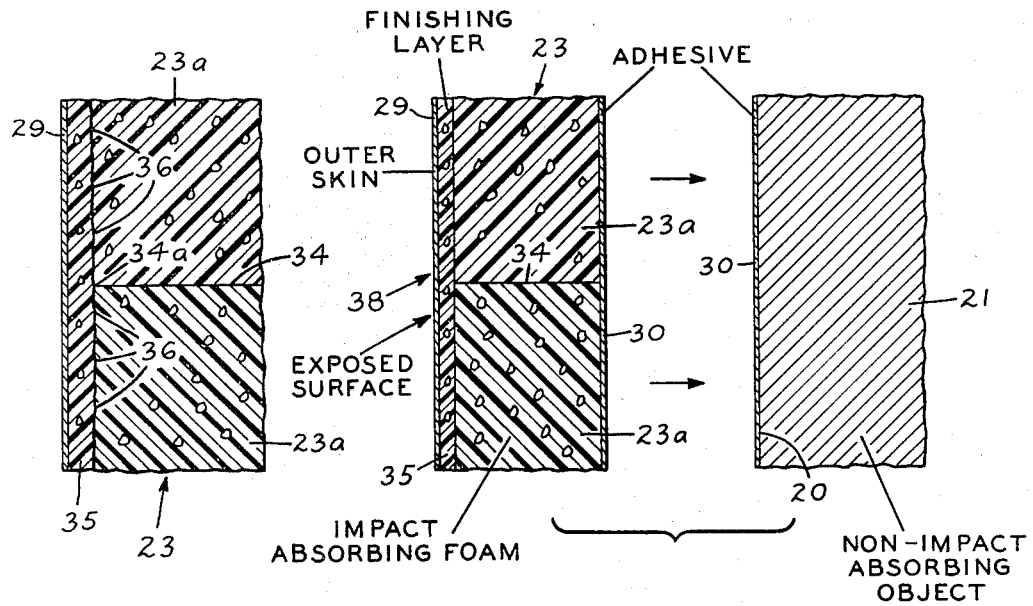

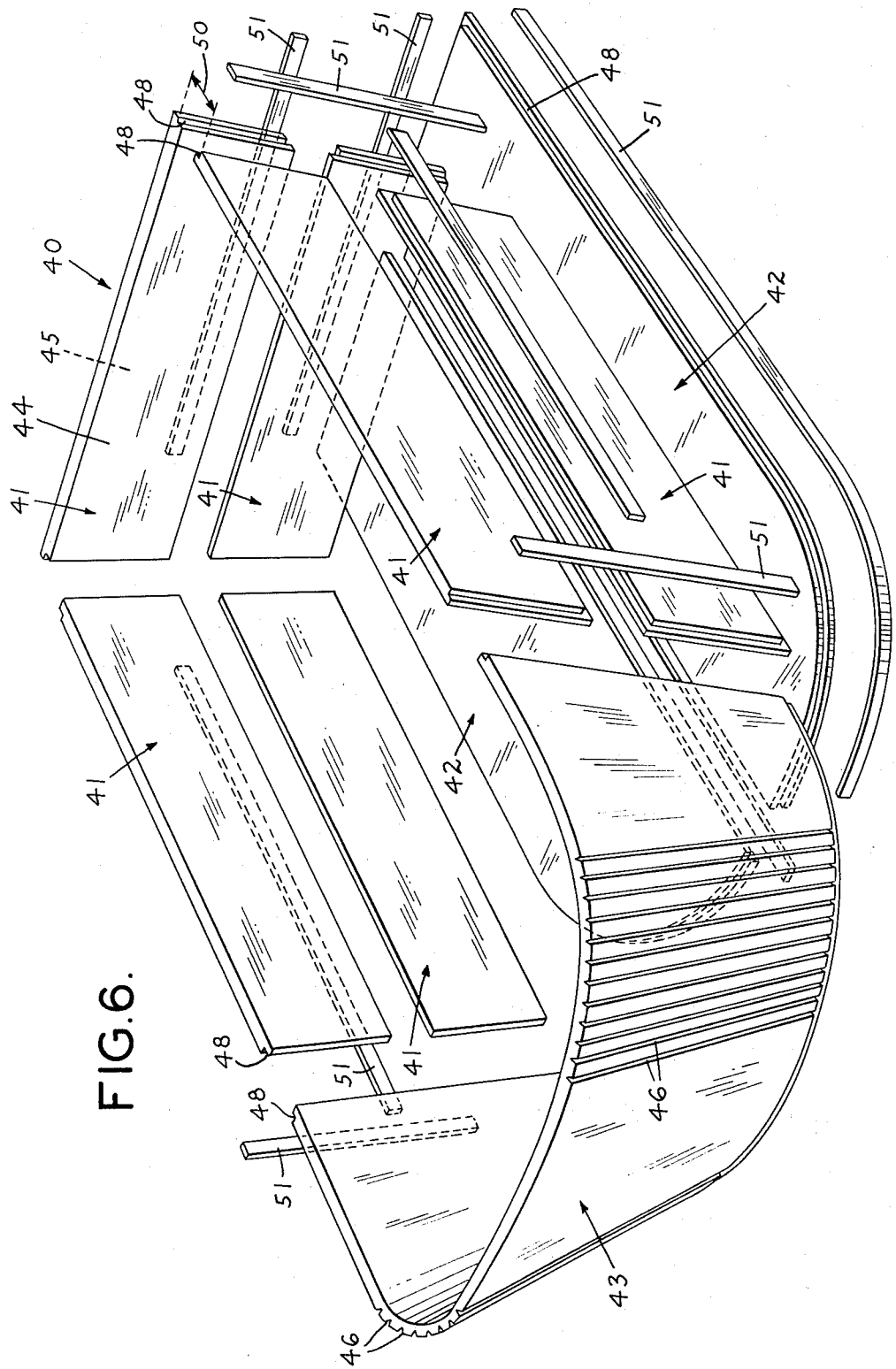

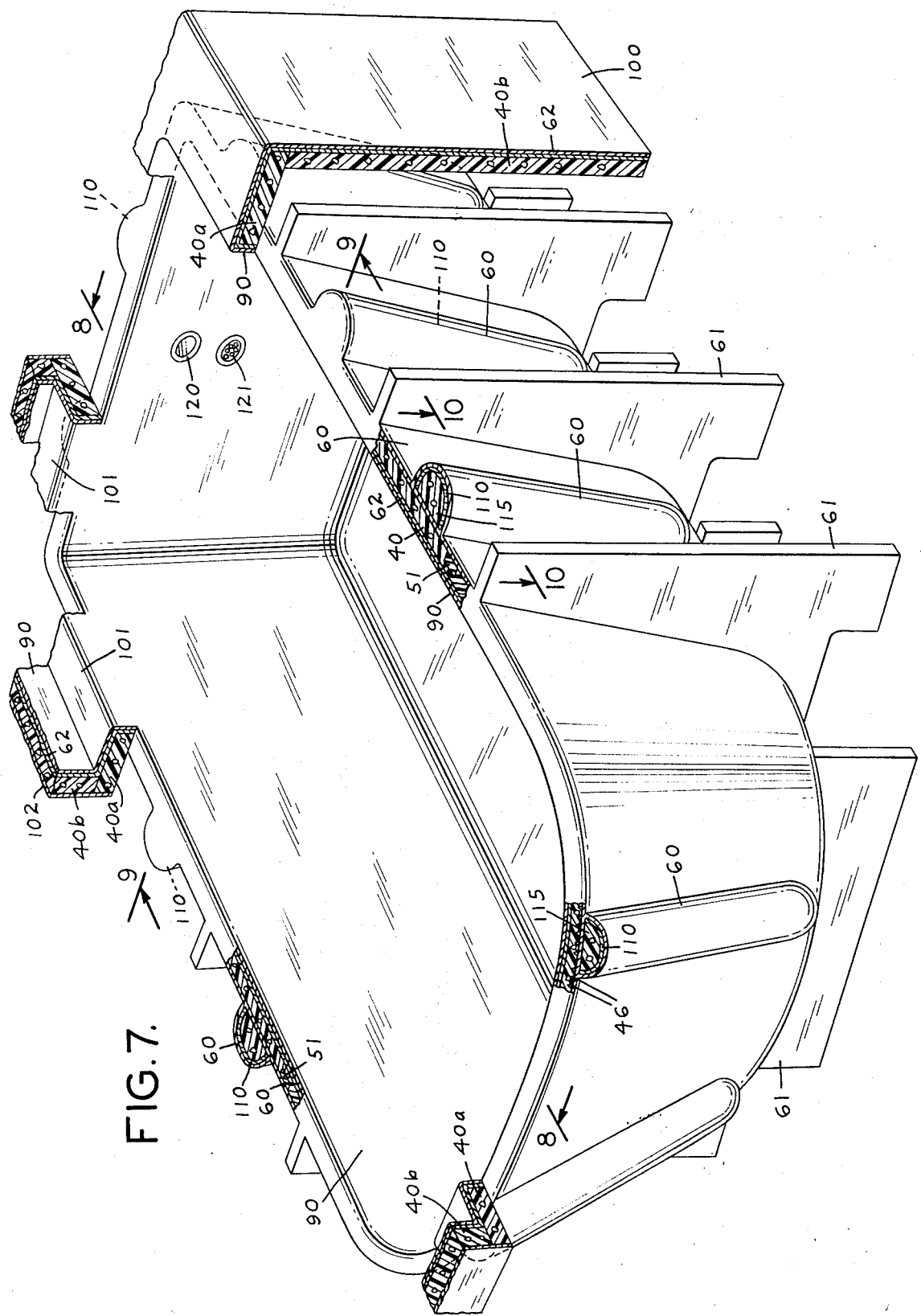

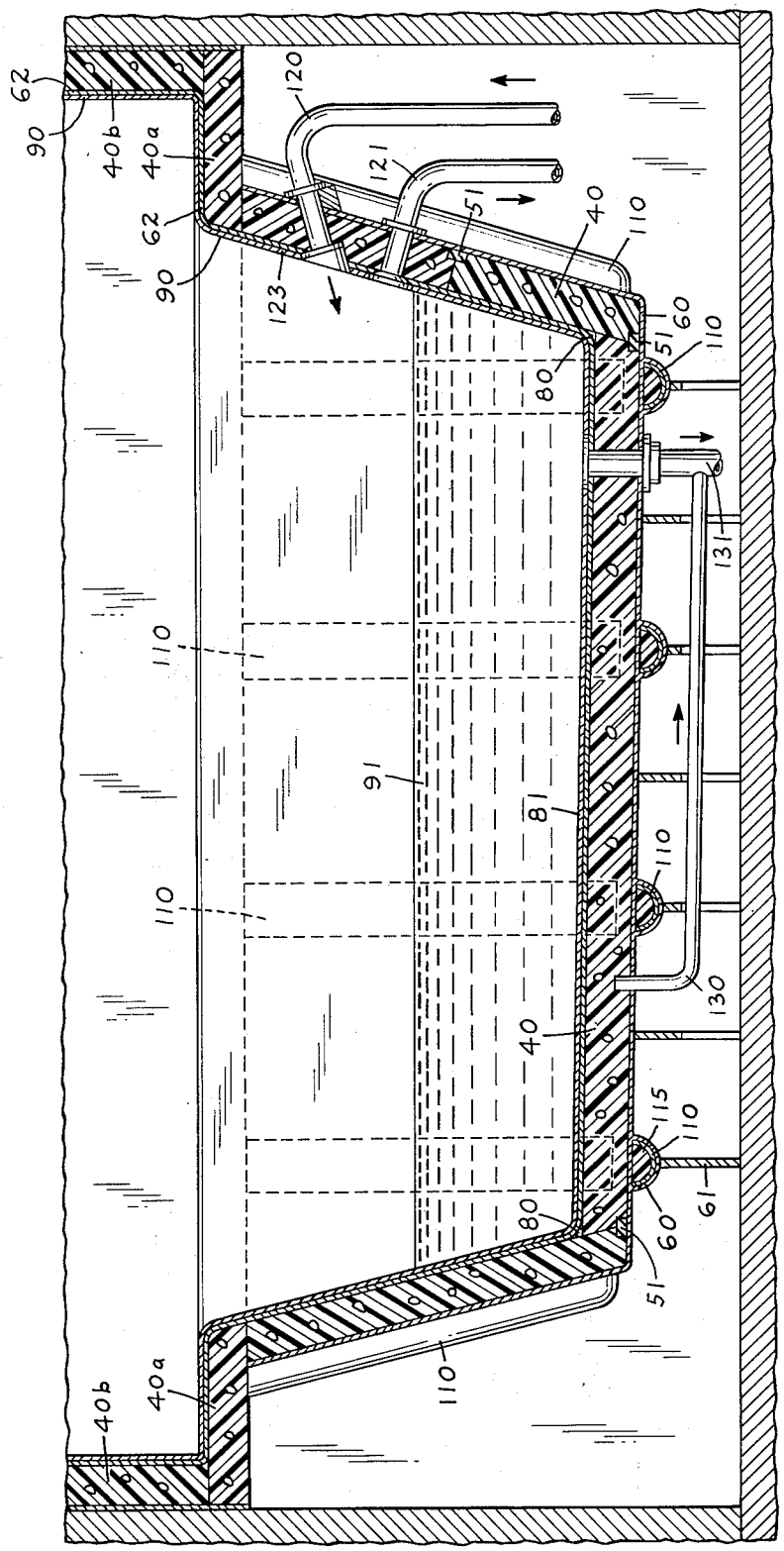

IMPACT ABSORBING LAMINATE AND ARTICLES FABRICATED THEREFROM

BACKGROUND OF THE INVENTION

Numerous objects exist in homes, offices, factories, recreational areas, hospitals, convalescent homes, etc. which, because of their location and inherent hardness, create a safety hazard when there is a high impact collision between the object and a part of the human body. Such collisions typically occur when one slips, falls or otherwise loses balance and is propelled into collision with the object. The problem is particularly acute for the aged and those suffering with infirmities. These collisions are highly prevalent in areas where slippage from water is an added problem such as in and around swimming pools and in household bathrooms. There have been numerous cases of persons either fatally or seriously injuring themselves by slipping in the bathtub, shower, or other areas of the bathroom and being propelled into a collision with nonimpact absorbing objects found in most bathrooms.

Several problems arise in attempting to render such objects impact absorbing and thereby reduce this hazard. For example, if the object is to be covered with, or fabricated from, an impact absorbing material, the material should not collapse upon impact to the extent of permitting the portion of the body striking it to collide with an underlying, rigid, non-impact absorbing surface. On the other hand, the impact absorbing material must collapse to a certain extent in order to absorb the impact and thus prevent damaging the portion of the body colliding with the material. The material should be water resistant and easy to clean, maintain and fabricate. Moreover, it should be substantially dent resistant, while at the same time not being too hard, so that it will recover from impacts without permanently marring the exposed surface of the material. It is also important that the surface of the material exposed to view be aesthetically pleasing. When the material is used as flooring, it must not collapse to the extent where loss of balance results when one walks on the flooring. It is thus seen that providing an impact absorbing material bringing all of these desirable features into balance presents a formidable task.

It is, therefore, a general object of this invention to provide an impact absorbing laminate having the aforementioned desirable properties.

It is another object of this invention to provide an impact absorbing laminate for use in the preparation of impact absorbing surfaces and in the fabrication of impact absorbing articles.

It is another object of this invention to provide an impact absorbing laminate which can be used to render impact absorbing, pre-existing surfaces which were not impact absorbing.

It is another object of this invention to provide an impact absorbing laminate which is sufficiently collapsible to absorb impact without permanent indentation or marring of the outer surface of the laminate while simultaneously remaining sufficiently impact absorbing so as to not injure the portion of the body producing the impact.

It is another object of this invention to provide an impact absorbing laminate which, though having acceptable impact absorbing properties, is not sufficiently collapsible or compressible to cause loss of balance when used as flooring.

It is another object of this invention to provide an aesthetically pleasing impact absorbing laminate having an outer surface layer which is substantially water impermeable and which is easy to clean and maintain.

It is still another object of this invention to provide a method for preparing the above described impact absorbing laminate and surfaces and articles fabricated therefrom.

These and other objects of this invention will be apparent to one skilled in the art from a consideration of this total disclosure and the accompanying drawings.

SUMMARY OF THE INVENTION

The above objectives are accomplished by providing an impact absorbing laminate comprising:

1. a layer of an impact absorbing foam;
2. a flexible finishing layer of a resinous material, a first surface of which is affixed to a first surface of the foam layer, this finishing layer producing substantially no effect upon the impact absorbing properties of the adjacent foam layer; and
3. a continuous, flexible outer skin layer of a substantially water impermeable resinous material, this outer skin being affixed to a second surface of the finishing layer. The laminate is further strengthened by affixing to a second surface of the impact absorbing foam layer a rigid, stiff, self-supporting backing layer which sandwiches the impact absorbing foam between the backing and finishing layer.

The Impact-Absorbing Foam

The determination of whether a given foam material is sufficiently impact absorbing to be employed in the laminate of this invention can be determined by measuring the dynamic cushioning characteristics of the foam following the test procedure outlined in MIL-C-26861A(USAF). This known test procedure represents an accepted standard for comparing the dynamic cushioning characteristics of various foam materials. It has been found that foams useful in the laminate of this invention, when tested in accordance with the above identified procedure, have a peak deacceleration of between about 35 and 80 G's, (32 feet/sec./sec.) and preferably 40 to 50 G's, at a static stress of about 1.0 p.s.i. on a sample having a thickness of about 2 inches and employing a drop height of about 24 inches.

It is preferable that the foam not be permanently marred when subjected to impact. To this end, foams are preferred which, after 50 percent compression for a period of 22 hours at room temperature, recover at least about 85 percent, and preferably at least about 88 percent, of their original height after a recovery period of about 100 hours. Stated another way, the foam should have a "compression set" of less than 15 percent and preferably less than about 12 percent. The procedure for measuring "compression set" values is known.

When the laminate is to be used for flooring, foams are preferred which are relatively unyielding to compressive forces so as to permit them to be walked upon without the walker loosing his balance. To this end, it is desirable to use foams which have less than about 25 percent deflection when subjected to a compressive strength of about 10 p.s.i. and preferably have less than 25 percent deflection when subjected to a compressive strength of about 13 p.s.i. The compression-deflection characteristics for any given foam are readily obtained in accordance with known procedures.

A wide variety of impact absorbing foam materials are employed in the laminate of this invention. It has generally been found that so called "high-density" plastic foams are particularly useful. Among such foams are included (i) polypropylene foams having a density of about 3-5 pounds per cubic foot, (ii) polyethylene foams having a density of about 2-9 pounds per cubic foot (iii) polyurethane foams having a density of about 4-16 pounds per cubic foot, and (iv) polyvinyl chloride foams having a density of about 8 to 30 pounds per cubic foot. Numerous other foams, including non-resinous foams, are contemplated within the scope of this invention.

Preferred foams include polypropylene foam having a density of about 5 pounds per cubic foot and polyethylene foams having a density of about 4-6 pounds per cubic foot. The thickness of the foam layer can vary considerably depending upon the type foam used and the application envisioned for the laminate. Generally, foam thickness range from about 1/2 to 3 inches and preferably from about 1 to 1 ½ inches.

The Finishing Layer

The flexible, resinous finishing layer forms an important part of this invention. This layer serves to mask or minimize defects in the underlying impact absorbing foam which can detract from the aesthetic qualities of the laminate. For example, it is often difficult to obtain smooth and even surfaces on the foam layer especially when the foam is cut, sawed, sanded, etc; moreover, in cases where the foam layer is assembled from a plurality of foam pieces by abutting the pieces and adhesively joining them together, uneven and often unsightly seams are created at the points of juncture. By covering the foam layer with a flexible resinous finishing layer, these defects can be effectively masked, or at least greatly minimized, so that they are not noticeable in the finished product.

In selecting a material for the finishing layer, it is important that it produce substantially no effect upon the impact absorbing properties of the adjacent foam layer, otherwise the impact absorbing properties of the laminate composite could be muted. To this end, it is desirable that the material be yielding and flexible and that the thickness of the layer be maintained as thin as possible, preferably not exceeding about 1/4 inch, with thicknesses of between about 1/16 and 1/8 inch being suitable in many applications.

The finishing layer can be fabricated from any relatively flexible resinous material. A foam material such as polyurethane foam, vinyl foam or an ionomeric foam is desirable since these materials have some impact absorption properties themselves and do not negate the overall impact absorbing properties of the laminate. However, films and sheets such as those fabricated from flexible vinyl and acrylic resins in suspension, polyethylene, polyurethane, polypropylene, and silicones can also be used. The chemical species of the material selected is of no significance provided the material masks the defects in the impact absorbing properties and still remains flexible. The finishing layer preferably forms a continuous covering for the underlying impact absorbing foam.

Ionomeric foams are preferred materials for use as a finishing layer. These foams are prepared from polymers having ethylene as their major component but contain both covalent and ionic bonds. The polymers exhibit very strong interchain ionic forces. The anions hang from the hydrocarbon chain and the cations are metallic, typically magnesium or zinc. These polymers have many of the same features as polyethylene plus high transparency, tenacity, resilience, and increased resistance to oils, greases, and solvents. Ionomeric polymers can also be described as a class of polymers in which ionized carboxyl groups create ionic cross links in the intermolecular structure. Ionomeric resins are described in greater detail in the Modern Plastics Encyclopedia, 1969-1970, pg. 140, said publication incorporated herein by reference. Numerous varieties of such resins are known and need not be repeated herein.

One suitable ionomeric foam material is a cross-linked closed cell polyethylene ionomeric foam available commercially under the tradename "Softlite" from Gilman Bros. Co. (Gilman, Conn.). "Softlite" was developed from Surlyn A ionomer resin (DuPont) and has a density of about 3 pounds per cubic foot.

When the laminate is used to construct articles having unusual geometric configurations, it becomes desirable to use as the finishing layer a workable mixture of variable consistency which can be readily shaped to fit the intricate curves, contours, corners, etc. of a given article. For example, in fabricating a bathtub, it is desirable to create a dished effect in the tub bottom as shown in greater detail hereinbelow. Although it is relatively easy to form the impact absorbing foam into the desired shape, it becomes more difficult with a thin finishing layer, especially where large, often unwieldy sheets of finishing layer are used. This problem is conveniently overcome by using as the finishing layer a mixture comprising from about 5 to 60 percent by weight (on a dry basis) of a finely ground impact absorbing foam as already described hereinabove, substantially uniformly dispersed throughout a resinous binder. The weight ratio of resinous binder to ground foam preferably ranges from about 0.5 to 6 on a dry basis. The resinous binder is any one of a variety of materials such as, for example, vinyl or acrylic resins. One such composition is prepared for application by admixing a commercially available acrylic latex paint with the required amount of ground high density polyolefin foam wherein substantially all of the foam particles have an average particle size ranging from about −20 mesh to +325 mesh, preferably with at least 90 percent by weight of the foam having an average particle size of between −20 mesh to +140 mesh. A typical screen analysis of a ground polyethylene foam suitable for use in such a composition is shown below:

Screen Analysis

| Screen Mesh | Opening (in.) | % Retained on Screen |
|---|---|---|
| 20 | 0.0331 | 1.8 |
| 40 | 0.0165 | 12.7 |
| 60 | 0.0098 | 45.6 |
| 80 | 0.0070 | 17.7 |
| 100 | 0.0059 | 5.4 |
| 140 | 0.0041 | 9.8 |
| 200 | 0.0029 | 4.0 |
| 325 | 0.0017 | 2.3 |
| Pan | — | 0.5 |

The acrylic paint employed contains about 21.7 percent by weight of a pigment (titanium dioxide) and 78.3 percent of a vehicle comprising about 35 percent acrylic resin (the binder) and 65 percent volatiles (water and alcohol). The amount of ground foam admixed with the acrylic paint depends upon the mixture consistency desired. A solids (foam plus paint solids) content of between about 50 and 75 percent is generally suitable. The consistency of the composition varies widely depending on the use to which it is put.

In use, the impact absorbing foam layer is covered with the putty to fill in cracks, seams, surface indentations, etc. thereby producing a substantially smooth uniform finishing layer over the foam surface. Since the mixture has a putty-like consistency, it can be shaped to fit intricate design contours as desired. Volatiles are removed from the applied putty material to set it into a completed finishing layer. Volatiles removal is effected by air-drying or can be accelerated with forced heat. After the material is set, it is sanded or otherwise finished to a smooth surface. The set material is a mixture of pigment, acrylic resin binder and ground foam wherein the amount of ground foam ranges from about 5 to 60 percent by weight on a dry basis and the weight ratio of resin binder to foam is about 0.5 to 6 on a dry basis. Preferred ground foams for inclusion in the putty are identical with the foams preferred for the impact absorbing foam layer. An advantage of this putty composition is that the resulting finishing layer itself has impact absorbing qualities by virtue of the finely ground foam dispersed throughout the layer.

The Outer Skin Layer

The outer skin layer provides a relatively thin, substantially water impervious, flexible, and preferably smooth resinous covering for the laminate structure. This covering is preferably about 2–20 mils in thickness. The chemical species of the material from which the outer skin is fabricated is not significant and thus it can be prepared from a number of materials such as, for example, vinyl resins, acrylic resins, urethane resins, and flexible polyester resins. Vinyl and acrylic resins are generally preferred, with the acrylic resins preferred for most applications because of the attractive, durable skin they provide. This skin can be applied to the finishing layer as a liquid comosition of the resin by brushing, rolling on, spraying, or can be applied as a thin layer using a suitable adhesive. Application as a liquid composition, followed by removal of volatiles to form the skin, is preferred.

A preferred material for imparting a vinyl outer skin is 341 Marine Vinyl Dip, commercially available from Flexabar Corp., North Bayonne, N.J. This material has a solids content of beteen 27 to 30 percent. A preferred composition for imparting an acrylic outer skin is a commercially available latex paint (Dutch Boy, white 19-10) containing about 21.7 percent titanium dioxide and 78.3 percent of a mixture made up of 35 percent acrylic resin and 65 percent of a mixture of water and alcohol.

Before the outer skin layer is applied to the finishing layer, it is often desirable to prime the finishing layer. The type primer required depends upon the nature of the surfaces to be joined. Such primers are known in the art and need not be repeated herein. One suitable primer for use with high density polyethylene foam is available from Atech, Inc., Toledo, Ohio, under the trade name Clear "E" Primer. This product contains about 10 percent solids by weight and can be sprayed on to one surface of the foam to produce a flexible film primer layer having a thickness of between .3–.5 mils. In cases where the finishing layer is the mixture of ground foam dispersed in a resin binder, as described hereinabove, a primer is not usually required.

The Stiff Backing Layer

A stiff, self-supporting backing layer is optionally provided to increase the rigidity of the laminate and to provide for easier handling and fabrication. This backing layer is preferably as thin as possible, generally between 1/16 and 1/4 of an inch. It may be fabricated from any rigid self-supporting material such as, for example, plywood, sheet asbestos, cardboard, acrylic sheets, high impact polystyrene, polycarbonates, metals such as aluminum or galvanized steel, reinforced polyester resins, and reinforced epoxy resins.

A preferred backing layer is fabricated from reinforced polyester resin. As is known, polyester resins consist of the reaction product of a dibasic acid and dihydric alcohol dissolved in a polymerizable monomer. Illustrative dibasic acids, dihydric alcohols and polymerizable monomers are well known in the art (See col. 2, lines 49–61 of U.S. Pat. No. 3,507,738) and need not be repeated herein. The polyester resin can be reinforced with numerous additives such as, for example, fibers of glass, jute, or burlap, as well as whiskers of boron, tungsten, and carbide. A preferred reinforcement additive is glass fibers.

Reinforced polyester and epoxy resins are particularly preferred when the backing layer is to be applied to a foam surface having an unusual geometric configuration (e.g., a corner) because these resins lend themselves to a hand lay-up technique of application which permits the resin to be readily shaped to fit the geometry of the foam surface. A first layer of a catalyzed resin mixture is sprayed, brushed or spatulated on to the foam surface. A layer of reinforcement material such as fiber glass is laid on the wet resin. As the resin soaks into the reinforcing layer, subsequent layers of resin are built up. When the required thickness is obtained, the resin is cured. A thixotropic additive such as a micropulverized silica (i.e., Cab-o-sil, Cabot Co, Cambridge, Mass.) is preferably added to the resin mixture to thicken it to the point where it does not run excessively during application.

Adhesives

The various layers of the laminate are affixed to one another to form a unitary structure using any one of a variety of conventional bonding techniques. The layers are preferably bonded together by coating adjacent surfaces with a thin layer of an adhesive which is left to dry anywhere from 10 minutes to 24 hours depending upon the adhesive used. The dry, tacky surfaces are then brought into contact under pressure to form a unitary structure. Many suitable adhesives are available including resinous pressure-sensitive adhesives, thermosetting adhesives, silicone adhesives, phenolic adhesives, ureas, epoxies, polyesters, and elastomeric adhesives. One such adhesive is the 3M Company's Scotch Grip Industrial Adhesive 4693. This adhesive has a synthetic elastomer base dissolved in an aliphatic solvent, and is applied to the layers of the laminate by brushing, rolling on, or spraying.

The impact absorbing laminate renders ordinarily hard, non-impact absorbing surfaces impact absorbing. For example, and as discussed in greater detail hereinbelow, the laminate is used to fabricate objects such as walls, flooring, ceilings, bathtubs, sinks, swimming pools, shower stalls, and other common household objects. When the laminate is used to fabricate a liquid receptacle vessel such as a tub or a swimming pool, it is ordinarily necessary to reinforce the structure to accommodate pressures generated by the liquid contained in the receptacle.

The invention is more fully described hereinbelow in conjunction with the accompanying drawings. In the ensuing detailed description, it is to be understood that the terms used to describe the layers of the laminate or the articles prepared from the laminate are intended to have the same meaning as set forth hereinabove in the Summary of the Invention.

BRIEF DESCRIPTION OF THE DRAWINGS

FIG. 3 is a view, similar to FIG. 1, illustrating a third embodiment of the laminate wherein the impact absorbing foam layer is fabricated from a plurality of abutting pieces of foam.

FIG. 4 is a view, exaggerated in size, of the encircled area of FIG. 3 and illustrates the masking of the irregularities in the surface of the impact absorbing foam by the finishing layer.

FIG. 5 is a view, similar to FIG. 1, showing a fourth embodiment of the laminate.

FIG. 6 is an exploded perspective view of the impact absorbing foam core of a bathtub prepared from a laminate of this invention.

FIG. 7 is a perspective view, partly in cutaway, of a finished bathtub fabricated from a laminate, said tub being constructed from the foam core of FIG. 6.

FIG. 8 is a side sectional view taken along the line 8—8 of FIG. 7.

DESCRIPTION OF THE PREFERRED EMBODIMENTS

FIGS. 1–5 illustrate several embodiments of the laminate as each is applied to a pre-existing surface 20 of a non-impact absorbing object 21, (a floor, wall, ceiling, countertop, etc.) to render surface 20 impact absorbing.

Figure 1:
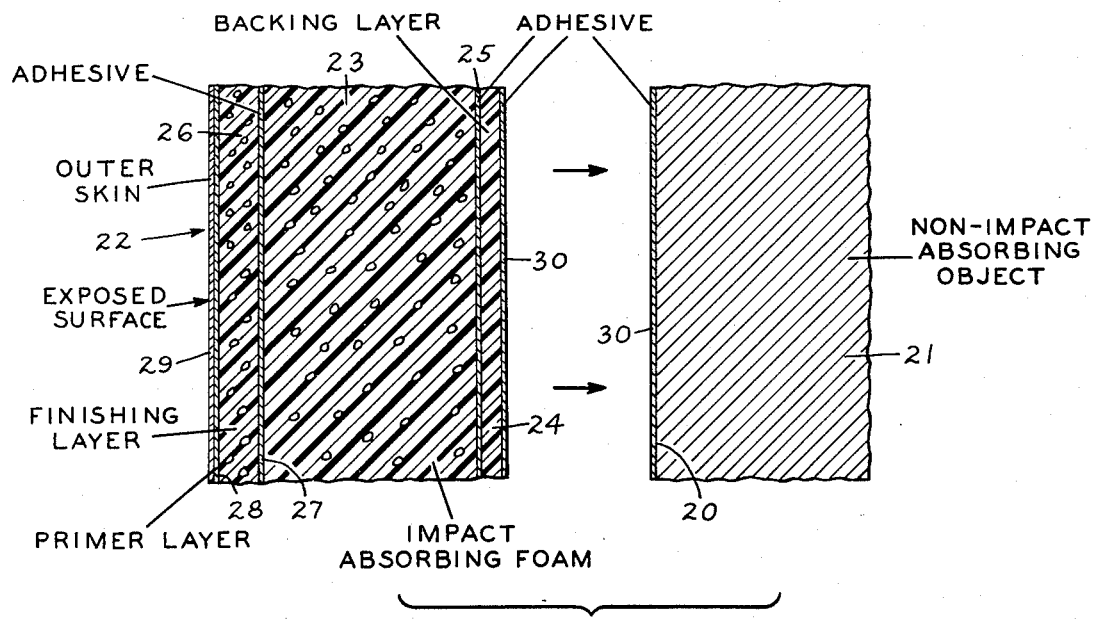
FIG. 1 is a partial side sectional view of an embodiment of the laminate illustrating the application of the laminate to a surface to render the surface impact absorbing.

In FIG. 1, the laminate 22 comprises a core layer 23 of an impact absorbing foam such as a high density polyethylene or polypropylene foam. A rigid, self-supporting glass reinforced polyester layer 24 is affixed to one surface of foam layer 23 by adhesive 25. A finishing layer of a cross-linked polyethylene ionomeric foam 26 is affixed to the opposite surface of foam layer 21 by adhesive 27. Finishing layer 26 is provided on one surface with a primer layer 28 which is adapted to tenaciously bond the outer skin of vinyl or acrylic resin 29 to this surface of layer 26. To render surface 20 impact absorbing, surface 20 and the exposed surface of backing layer 24 are coated with an adhesive 30 and then joined together under pressure until the adhesive sets to form a tenacious bond between the surface 20 and the laminate 22.

Figure 2:
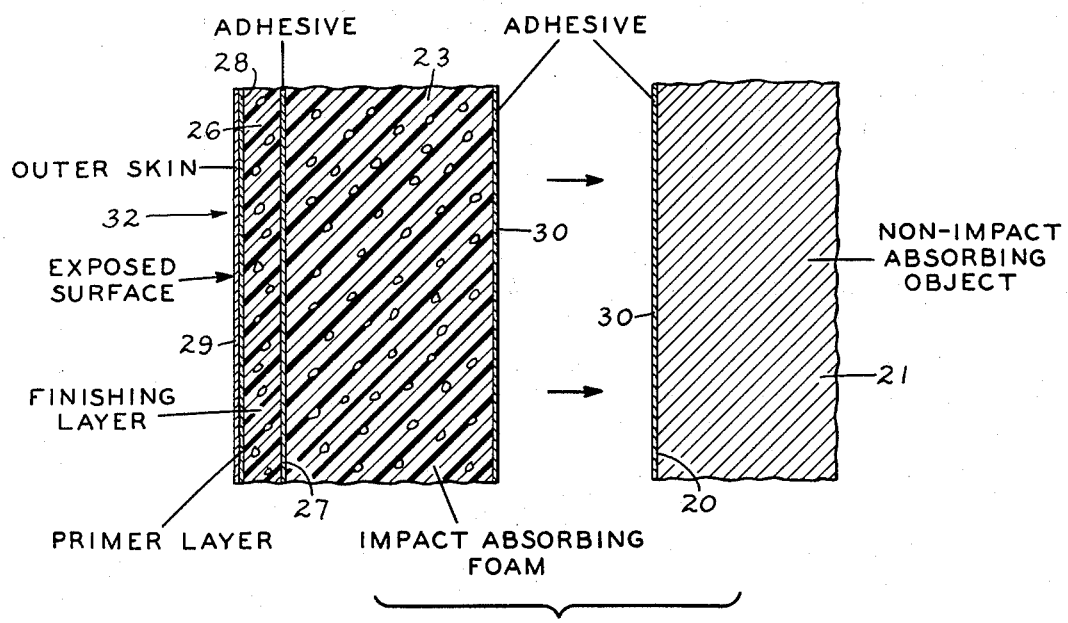
FIG. 2 is a view, similar to FIG. 1, of a second embodiment of the laminate.

The laminate 32 shown in FIG. 2 is identical to that shown in FIG. 1 except that the rigid, self-supporting glass reinforced polyester backing layer 24 and adhesive 25 are omitted. Backing layer 24 is added to impart added rigidity and strength to the laminate and is not always necessary. For example, the impact absorbing foam material could be directly applied to surface 20 as shown in FIG. 2 without need for the intervening backing layer 24. Layer 24 is desirable, however, if the laminate is to be subjected to heavy handling such as might occur during shipment of the laminate from a factory to the work site.

In FIG. 3, the foam core layer 23 of laminate 33 is fabricated from a plurality of foam pieces 23a which are aligned in tight abutment and joined together by welding, or an adhesive, along a seam 34. A glass reinforced polyester layer 24 is attached to foam layer 23 by adhesive 25 as in FIGS. 1 and 2. However, in FIG. 3 the finishing layer 35 is not fabricated from an ionomeric foam material as in FIGS. 1 and 2 but instead is fabricated from a mixture of finely ground impact absorbing foam (high density polyethylene) dispersed in an acrylic resin binder, as described hereinabove. Finishing layer 35 is initially formed in putty-like consistency by admixing the ground foam with an acrylic latex paint as described hereinabove. The putty is applied to one surface of foam layer 23 to produce a smooth and uniform surface by filling in and covering the numerous irregularities 36 and exposed seams 34a which are shown in exaggerated dimensions in FIG. 4. The primary function of the finishing layer, whether it be an ionomeric foam 26 or a foam dispersed in the acrylic resin 35, is to smooth over these irregularities 36 and exposed seams 34a to produce a smooth uniform finish for the foam layer 23. Layer 35 is sanded or otherwise finished to the desired smoothness. Because it is applied as a putty consistency, layer 35 can be shaped and contoured during application to meet the geometric requirements of any given structure. An outer acrylic or vinyl skin 29 is then applied to the exposed surface of layer 35 by airless spraying, rolling or brushing. The primer layer 28 required for the ionomeric foam 26 in FIGS. 1 and 2 is not required with resinous ground foam layer 35.

FIG. 5 is an embodiment of laminate 38 identical to that shown in FIG. 3 except that the glass reinforced polyester layer 24 and the adhesive 25 which secures it to foam layer 23 are omitted for reasons identical to those described hereinabove for its omission in FIG. 2.

The Bathtub

FIGS. 6–10 illustrate the use of the impact absorbing laminate of this invention in preparing a liquid receptacle vessel which, for purposes of illustration, is a bathtub although it will be understood that other liquid receptacles such as swimming pools, sinks, toilet flush tanks, etc., are similarly prepared.

Figure 9:
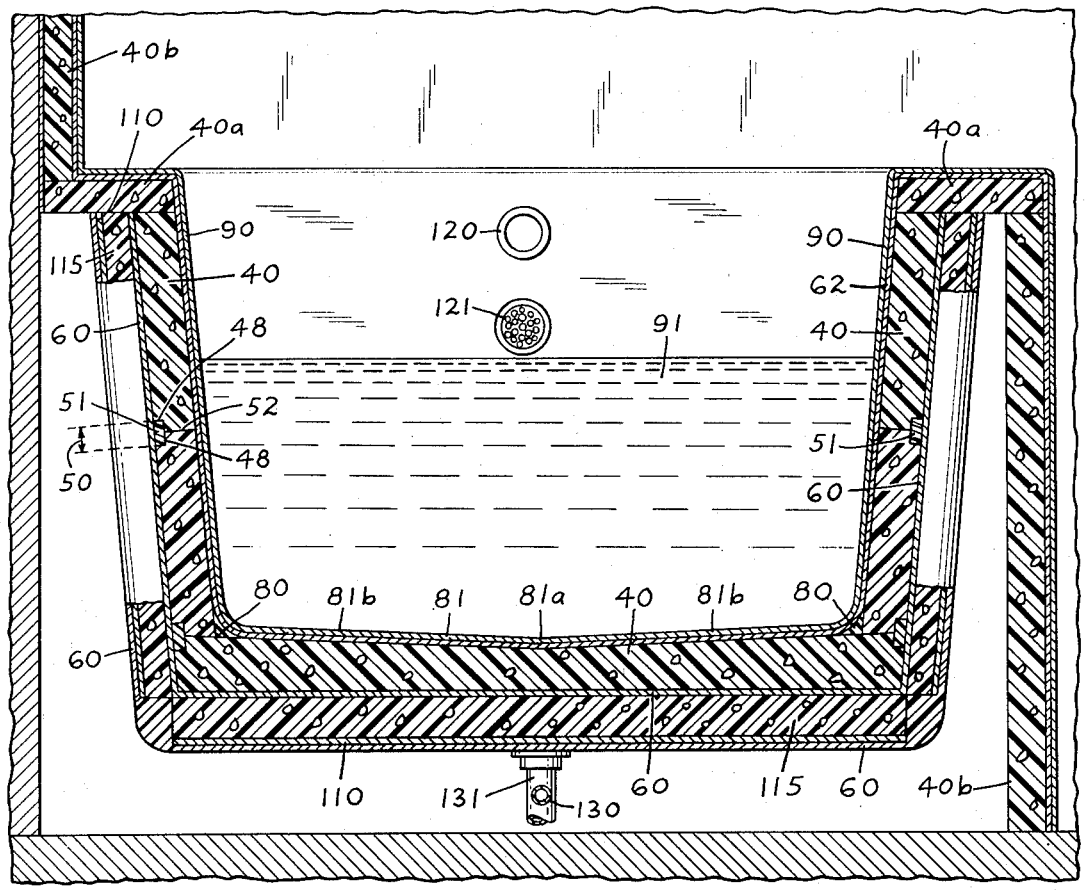
FIG. 9 is an end sectional view taken along the line 9—9 of FIG. 7.
Figure 10:
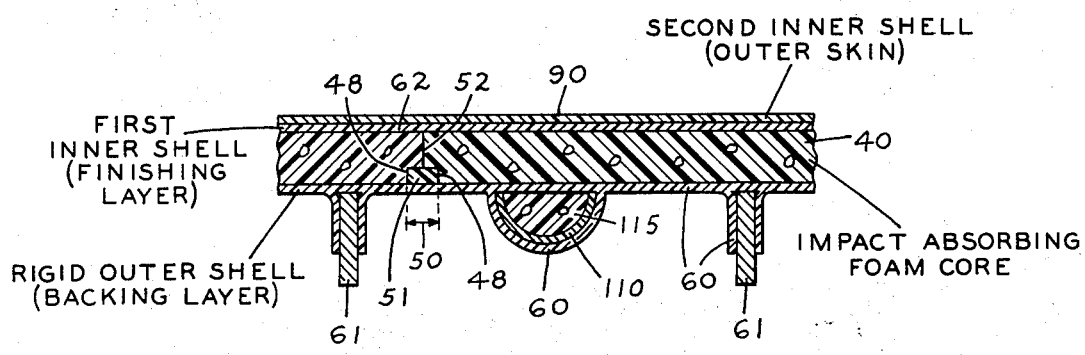
FIG. 10 is a top sectional view taken along the line 10—10 of FIG. 7.

In preparing the tub, it is convenient to first fabricate a core 40 (see FIG. 6) of the impact absorbing foam, said core comprising a plurality of pre-cut side and front wall portions 41, two bottom portions 42, and a back wall portion 43. Core 40 has an inner surface 44 adjacent to the liquid which the tub is to contain and outer surface 45 more remote from this liquid. The individual pieces making up the wall and floor portions 41 and 42 are cut to the required size and shape from commercially available larger pieces of either high density polyethylene or polypropylene foam material, preferably using a hot wire cutting technique. The wall portions 41 and 43 are generally rectangular in dimension. The portion 43 which is to form the backrest of the tub is provided with a plurality of closely spaced external parallel vertical notches 46 which permit section 43 to be bent or shaped into the required configuration for a tub backrest. The backrest is set in position by joining the edges of portion 43 to the edges of portions 41 and 42. The bottom portions 42 are generally rectangular in configuration at one end and quarter circled in configuration at the other end to adapt them to communicate with the semi-circular bottom portion of backrest member 43. The wall and floor portions 41, 42 and 43 are joined together by providing each portion with a notch 48 extending along their abutting edges so that, when two abutting members are joined together, the notches 48 of each abutting member communicate with one another to form an enlarged notch 50 which is adapted to receive a sealing strip 51 (not all of which are shown) of the same material as members 41, 42 and 43. The communication of abutting notches 48 to form an enlarged notch 50 is best seen in FIGS. 9 and 10.

When two adjoining pieces of foam are brought into tight abutment, the surface of notch 50 and an adjacent surface of sealing strip 51 are heated with hot gas. Strip 51 is then inserted into notch 50 where it fuses with each of the abutting members to thereby join them securely together and cover the seam 52 between the members. To further improve the seal, it is desirable to flame weld the resulting seam 52 on the inner surface 44 of the foam core.

Once the core of impact absorbing foam has been prepared by sealing together the wall and floor portions 41, 42, and 43 by placing all of the required sealing strips 51 in the notches 50, a rigid outer shell of a configuration substantially identical to that of the foam core 40 is affixed to the outer surface of the foam core. This is conveniently accomplished by coating the unprimed outer surface 45 of foam core 40 with a hand layup of a layer of a catalyzed mixture of a flowable and shapeable polyester resin. A sheet of reinforcing glass fiber is then laid on the wet resin. The resin soaks the glass fiber sheet which is then used as a base on which to build subsequent layers of resin. Additional polyester resin is then applied on top of the original reinforced polyester resin layer if desired. Upon curing, the reinforced resin sets into a hard rigid outer shell which encases foam core 40. This outer shell of reinforced polyester resin 60 is best seen in FIGS. 7–10. Foam core 40 is totally encased in glass reinforced polyester resin shell 60. At this stage of construction, the tub has a fair amount of rigidity and can be conveniently inserted into a plywood cradle 61.

The tub is next provided with a first inner shell 62 of a configuration substantially identical of that of the foam core 40. Shell 62 is affixed to the inner surface 44 of foam core 41 and generally comprises a flexible resinous finishing layer which produces substantially no effect upon the impact absorbing properties of the underlying foam core 40. Shell 62 functions to mask the imperfections and the seams 52 present in the inner surface 44 of foam core 40. Shell 62 (best seen in FIGS. 7–10) preferably comprises finely ground impact absorbing foam dispersed in an acrylic resin. Shell 62 is applied uniformly against the inner surface of foam core 40 as a putty formed by admixing the ground foam with an acrylic based latex paint. The ability of this putty to be shaped to fit the contour of the tub is a great advantage. As can be seen in FIGS. 8 and 9, it is necessary in order to give the tub a dished and comfortable shape to provide circular molding strips 80 which run along the edges of the tub bottom 81. The putty-like material is used to contour shell 62 over molding strips 80. After the putty sets, shell 62 is sanded or otherwise finished to provide a smooth outer surface.

The tub is next provided with a second inner shell 90 (best seen in FIGS. 7–10) of a configuration substantially identical to that of the foam core 40, this second inner shell 90 being affixed to that surface of that first inner shell 62 opposed to that to which the foam core 40 is affixed. This second inner shell 90 comprises a layer of a smooth, continuous, flexible, substantially water impermeable skin which is in direct contact with the liquid 91 contained in the tub. Shell 90 is preferably an acrylic resin which is sprayed, brushed, rolled or otherwise applied onto shell 62.

It is seen that the assembled tub has been fabricated from the laminate of this invention. The rigid outer shell 60 is the backing layer of the laminate and the two inner shells 62 and 90 are the finishing and outer skin layers, respectively, (see FIG. 10).

Referring to FIG. 7, cutaway portions 100 and 101 illustrate how the tub is disposed adjacent to pre-existing bathroom walls. In cutaway 101, the foam core 40 is extended first horizontally 40a and then vertically 40b with the vertical portion 40b being adjacent a pre-existing wall (not shown). An adhesive layer 102 joins portion 40b to this pre-existing wall. The first inner shell 62 and the second inner shell 90 is continued upwardly along the side wall of the tub until reaching the top of horizontal foam member 40a at which point it bends into a horizontal position covering the top of member 40a until reaching vertical member 40b at which point it bends into the vertical position and continues to cover the external surface of vertical foam member 40b. At any convenient point, such as member 40a, the ground foam putty from which shell 62 is fabricated can be discontinued and replaced by a layer of ionomeric foam.

Cutaway portion 100 is identical to cutaway portion 90 except that member 40b now extends vertically downward to contact the floor of the bathroom (not shown) instead of extending vertically upward in proximity to the bathroom wall. Cutaway 100 is extended across the entire length of the tub to mask the innards of the tub in a completed bathroom.

Referring to FIG. 8, it is seen that the water inlet 120 and overflow 121 are flush with the front wall 123 of the tub. To permit proper entry of the water through inlet 120, it is necessary that this conduit be disposed at an angle somewhat greater than the horizontal; similarly, to permit proper overflow drainage through overflow 121, it is necessary that this conduit be disposed at an angle slightly below the horizontal.

It is also desirable to provide a plurality of drainage conduits 130 which provide communication between foam core 40 and the tub drain 131. These conduits 130 are helpful in draining condensation which can accumulate in foam core 40 and which could cause buckling or dislodgment of inner shells 62 and 90 from core layer 40. Drain 131, for purposes of clarity, is shown further spaced from front wall 123 than it would be in actual usage. Drain 131 would ordinarily be directly adjacent wall 123.

As further seen in FIG. 8, the bottom 81 of the tub is contoured downwardly toward drain 131 to produce drainage at the front end of the tub. Similarly, as seen in FIG. 9, the bottom 81 of the tub is lowered slightly at its center 81a to produce drainage inwardly from the sides toward the center 81a of the tub.

Although a bathtub was selected to illustrate a liquid receptacle vessel prepared from the laminate of this invention, other geometric configurations are prepared in a similar manner. For example, instead of a bathtub configuration, a wash basin configuration could be constructed with the bottom portion of the basin being dished to produce drainage in the central area of the bottom portion. Similarly, a toilet flush tank configuration could be fabricated. On a somewhat larger scale, a swimming pool could be constructed from a substantially identical configuration.

In order to support the pressures generated by the weight of the water in the tub, it is necessary to provide means for reinforcing the wall and bottom portions of the tub. Referring to FIGS. 7-10, and in particular FIGS. 7 and 10, said reinforcing means comprises a plurality of cardboard members 110 of half cylinder configuration affixed to the other surface of the rigid outer shell 60. Members 110 are affixed to the walls of the tub and to the bottom of the tub. They are conveniently affixed to the rigid outer shell 60 by extending shell 60 around members 110 when shell 60 is being initially applied to core 40 (see FIG. 10). This outer shell of glass reinforced polyester resin 60 provides an external coating for the half cylinders 110. Each half cylinder 110 is then filled with any suitable rigid plastic foam material 115 which, preferably, is a foamed-in-place rigid polyurethane, isocyanate or phenolic foam which is poured into the interior of member 110 and foamed therein.

Other reinforcing means can be employed besides the cardboard half-cylinders. For example, any suitable reinforcing configuration of a material, such as stamped stainless steel or aluminum, corrugated materials, earth or fill backing etc. can be used. Suitable reinforcing configurations include "V" shaped members, angle irons, etc.

THE SHOWER STALL

Figure 11:
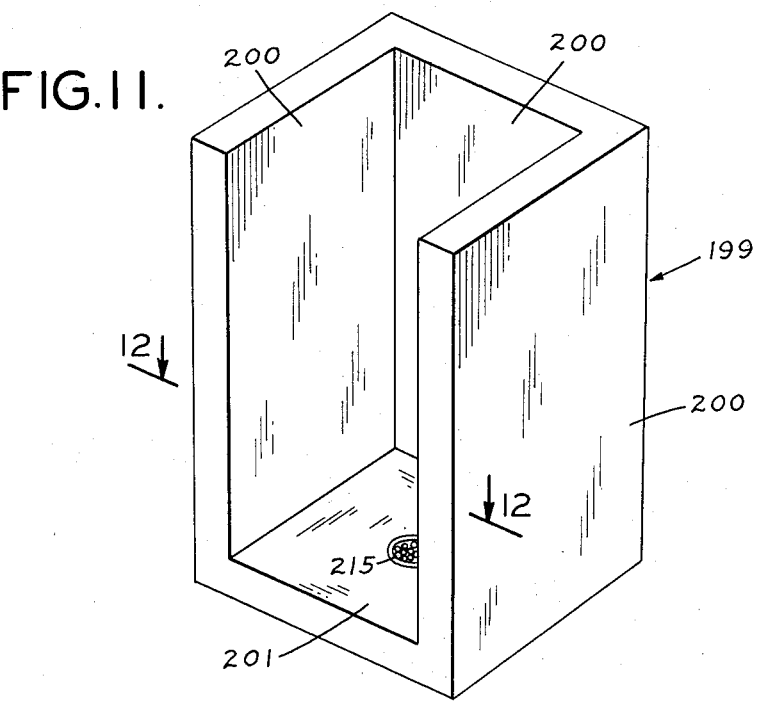
FIG. 11 is a perspective view of a finished shower stall prepared from a laminate of this invention.
Figure 12:
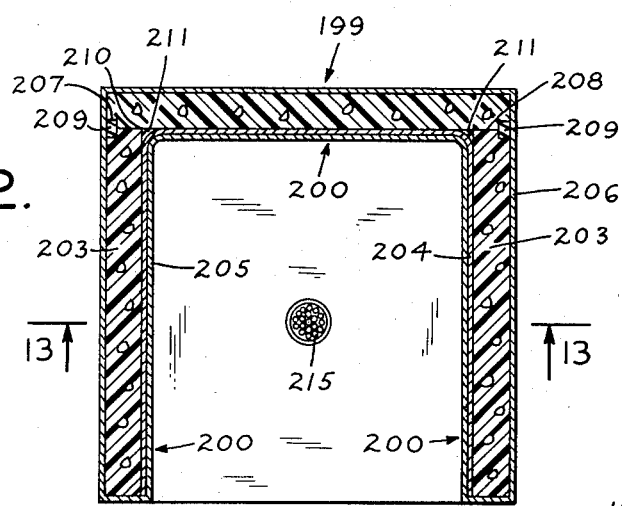
FIG. 12 is a top sectional view taken along the line 12—12 of FIG. 11.
Figure 13:
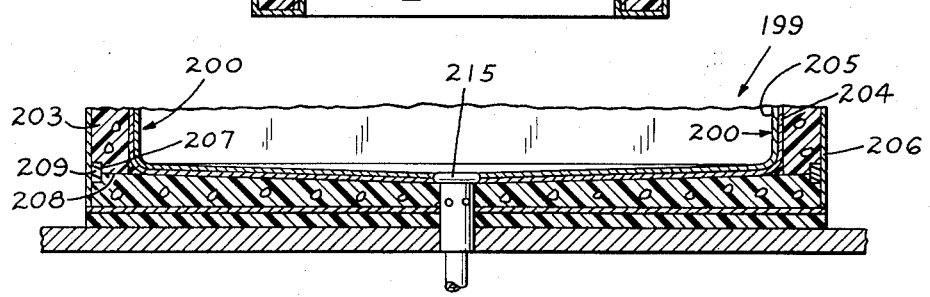
FIG. 13 is a partial side sectional view of the bottom of the shower stall taken along the line 13—13 of FIG. 12.

A shower 199 stall fabricated from the impact absorbing laminate is depicted in FIGS. 11-13. This stall comprises wall portions 200 and a floor portion 201 fabricated from a laminate comprising (see FIGS. 12-13) a layer 203 of an impact absorbing foam such as high density polyethylene or polypropylene foam, a flexible resinous finishing layer 204 preferably fabricated from an ionomeric foam, and a layer 205 of a continuous, substantially water impermeable skin forming the interior surface of the wall and floor portions, this skin preferably being an acrylic or vinyl resin and affixed to a surface of the finishing layer 204. The shower stall may be optionally provided with a rigid, self-supporting backing layer 206 preferably fabricated from a fiber glass reinforced polyester, this layer 206 being attached to a surface of foam layer 203 by a suitable adhesive (not shown).

The laminate is assembled into the configuration of a shower stall in a manner similar to that described hereinabove for the tub. The abutting pieces of foam 203 are provided with a notch 207 which overlaps the seam 208 between the abutting foam pieces and into which is inserted a sealing strip 209 which is affixed into the notch using a hot air welding technique. The inner seam 210 of the abutting pieces of foam 203 is then subjected to a hot flame weld for further sealing of the two foam pieces. Mold strips 211 are provided to smooth the corners of the stall.

As best seen in FIG. 13, the floor 201 of the shower stall is dished toward the center drain 215 to facilitate removal of water from the shower stall.

MISCELLANEOUS BATHROOM OBJECTS

FIGS. 14-17 depict miscellaneous objects, particularly bathroom objects, which are ordinarily not impact absorbing objects but which are rendered impact absorbing by virtue of being coated with the laminate of this invention.

Figure 14:
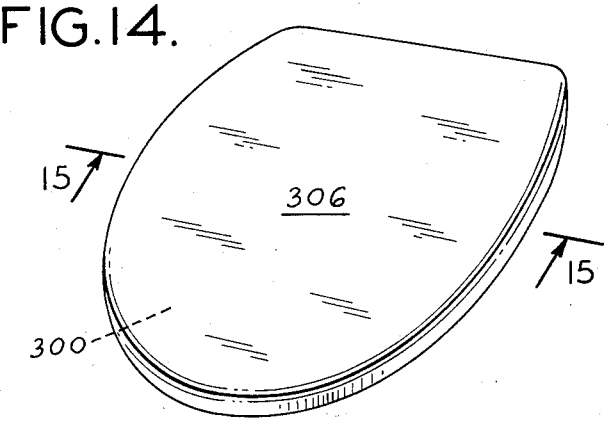
FIG. 14 is a perspective view of a toilet seat lid which has been rendered impact absorbing when covered with a laminate of this invention.
Figure 15:
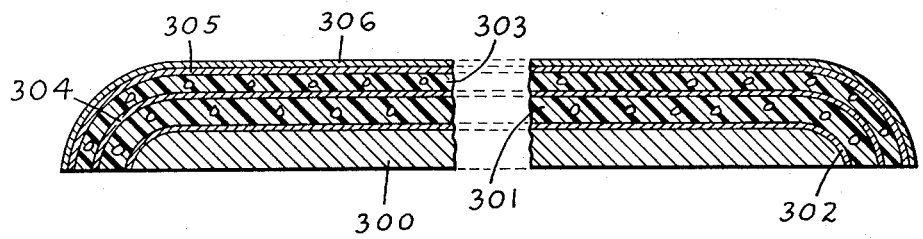
FIG. 15 is a sectional view taken along the line 15—15 of FIG. 14.
Figure 16:
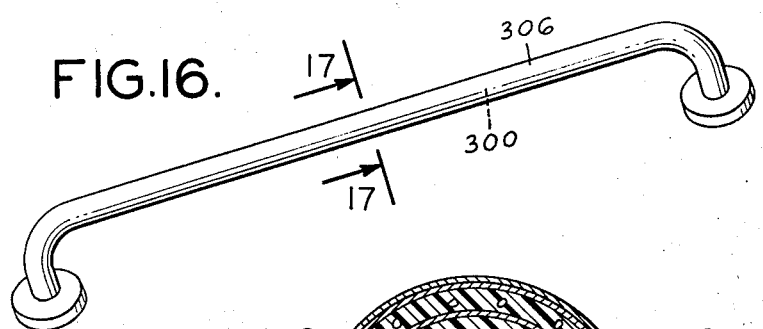
FIG. 16 is a perspective view of a towel rack which has been rendered impact absorbing when covered with a laminate of this invention.
Figure 17:
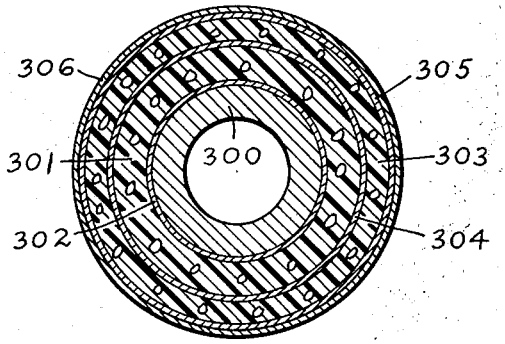
FIG. 17 is a sectional view taken along the line 17—17 of FIG. 16.

FIG. 14 depicts a toilet seat lid whereas FIG. 16 depicts a typical bathroom towel bar. These and objects similar to them are impact absorbing objects which generally comprise a non-impact absorbing object 300 which is provided with a protective covering laminate having impact absorbing properties. The laminate comprises a layer 301 of an impact absorbing foam such as high density polyethylene or polypropylene, a first surface of which is affixed to the non-impact absorbing object 300 by means of adhesive 302. A flexible resinous finishing layer 303, preferably of an ionomeric foam material, is affixed to a second surface of foam layer 301 by adhesive 304. Foam layer 303 is provided with a primer coat 305 and is then coated with an external flexible, continuous, substantially water impermeable skin 306, preferably of a vinyl or acrylic resin.

The laminate of this invention and the various articles prepared therefrom can be fabricated and prepared using a variety of techniques other than those specifically illustrated in this specification. For example, vacuum forming, thermo-forming, injection molding, and foamed-in-place techniques can also be employed as will be apparent to those skilled in the art.

The embodiments of the invention depicted in the accompanying drawings and described in this specification are illustrative only and such alterations and modifications thereof as would be suggested to one skilled in the art are deemed to fall within the scope and spirit of the claims appended hereto.

What is claimed is:

1. An impact absorbing laminate, and articles fabricated therefrom, consisting essentially of:
   1. A layer of an impact absorbing foam;
   2. A finishing layer, a first surface of which is attached to said layer of impact absorbing foam, said finishing layer being a mixture comprising from about 5 to 60 percent by weight, on a dry basis, of a ground impact absorbing foam dispersed in a resinous binder wherein the weight ratio of binder to foam is about 0.5 to 6, and wherein substantially all of said ground foam has an average particle size of − 20 mesh to + 325 mesh; and
   3. A thin outer skin layer of a continuous, flexible substantially water impermeable, resinous material affixed to a second surface of said finishing layer.

2. The laminate of claim 1 wherein said foam is characterized, in accordance with the procedure outlined in MIL-C-26861A (USAF), by having a peak deacceleration of between about 35 and 80 G's at a static stress of about 1.0 p.s.i. on a sample having a thickness of about 2 inches and employing a drop height of about 24 inches.

3. An impact absorbing laminate, and articles fabricated therefrom, comprising:
   1. a layer of an impact absorbing foam;
   2. a finishing layer, a first surface of which is attached to said layer of impact absorbing foam, said finishing layer being a mixture comprising a ground impact absorbing foam substantially uniformly dispersed throughout a resinous binder; and
   3. an outer skin layer of a continuous, flexible, substantially water impermeable resinous material affixed to a second surface of said finishing layer.

4. An impact absorbing laminate, and articles fabricated therefrom, consisting essentially of:
   1. a layer of an impact absorbing foam selected from the group consisting of:
      a. polyethylene foams having a density of about 2 to 9 pounds per cubic foot; and
      b. polypropylene foams having a density of about 3 to 5 pounds per cubic foot;
   2. a foam finishing layer, a first surface of which is attached to said layer of impact absorbing foam, said finishing layer being of lower density than the impact absorbing foam; and
   3. an outer skin layer of a continuous, flexible, substantially water impermeable resinous material affixed to a second surface of said finishing layer.

5. The laminate of claim 4 wherein the polyethylene has a density of about 4 to 6 pounds per cubic foot, the polypropylene has a density of about 5 pounds per cubic foot and wherein the foam finishing layer is an ionomeric foam.

6. The laminate of claim 3 further including a rigid, self-supporting backing layer affixed to said layer of impact absorbing foam to sandwich the layer of impact absorbing foam between the backing layer and finishing layer.

7. The laminate of claim 4 further including a rigid, self-supporting backing layer affixed to said layer of impact absorbing foam to sandwich the layer of impact absorbing foam between the backing layer and finishing layer.

8. The laminate of claim 5 further including a rigid, self-supporting backing layer affixed to said layer of impact absorbing foam to sandwich the layer of impact absorbing foam between the backing layer and finishing layer.

* * * * *